United States Patent [19]

Gnyra

[11] Patent Number: 5,033,721
[45] Date of Patent: * Jul. 23, 1991

[54] INSULATING LIGHTWEIGHT REFRACTORY MATERIALS

[75] Inventor: Bohdan Gnyra, Kingston, Canada

[73] Assignee: Alcan International Limited, Montreal, Canada

[ * ] Notice: The portion of the term of this patent subsequent to Oct. 10, 2006 has been disclaimed.

[21] Appl. No.: 395,779

[22] Filed: Aug. 18, 1989

Related U.S. Application Data

[63] Continuation-in-part of Ser. No. 208,255, Jun. 17, 1988, Pat. No. 4,873,209.

[30] Foreign Application Priority Data

Jun. 26, 1987 [CA] Canada ................................. 540710

[51] Int. Cl.$^5$ .............................................. C04B 35/71
[52] U.S. Cl. .................................... 266/280; 501/95; 501/123; 501/125; 501/128; 501/133
[58] Field of Search ....................... 266/280, 283, 286; 501/95, 123, 125, 128, 133

[56] References Cited

U.S. PATENT DOCUMENTS

| | | | |
|---|---|---|---|
| 4,174,331 | 11/1979 | Myles | 260/29.1 R |
| 4,221,595 | 9/1980 | Zebrowski | 501/100 |
| 4,248,752 | 2/1981 | Myles | 260/29.1 R |
| 4,366,255 | 12/1982 | Lankard | 501/95 |
| 4,430,121 | 2/1984 | Shima | |
| 4,455,246 | 6/1984 | Schmidt | 501/95 X |
| 4,506,025 | 3/1985 | Kleeb et al. | 501/133 X |
| 4,773,470 | 9/1988 | Libby et al. | 104/487 |
| 4,857,489 | 8/1989 | Bearden | 501/95 |

FOREIGN PATENT DOCUMENTS 165754 12/1985 European Pat. Off. .
2311816 3/1973 Fed. Rep. of Germany .
0040624 4/1975 Japan ................................ 501/133
1278473 6/1972 United Kingdom ................ 501/133

OTHER PUBLICATIONS

Chemical Abstracts 47651q, vol. 105, No. 6, Aug. 1986, p. 299.
Chemical Abstracts 116858c, vol. 89, 1978, p. 473.

*Primary Examiner*—Karl Group
*Attorney, Agent, or Firm*—Cooper & Dunham

[57] ABSTRACT

Insulating lightweight refractory materials which are resistant to attack by molten metals, particularly molten aluminum and its alloys and compositions used to form such materials. The materials are settable compositions which comprise a mixture of ceramic fibres, wollastonite powder, milled and/or screened vermiculite (optional), aqueous colloidal silica having a solids content of about 5–25% and preferably 12–15% by weight, and unmilled vermiculite. The weight ratio of the ceramic fibers to the wollastonite powder to the milled and/or screened vermiculite (when present) is 0.8–1.2:1-.5–2.5:0.25–0.75, respectively. The amount of the unmilled vermiculite is up to 50% by weight of the total weight of the other solid ingredients. The composition optionally contains carbon fibres, metal fibres or inorganic fibres as reinforcements. The composition can be cast to form shaped products or used as a joining material or as a "face-off" material to protect an underlying article. When dried, the composition forms a material which is insulating, light-weight and resistant to high temperatures and chemical attack by metals. The material can be made even more resistant to attack by a silicate coating and a fluoride solution surface treatment. The material is useful for forming items used in metal foundries and the like.

39 Claims, 1 Drawing Sheet

INSULATING LIGHTWEIGHT REFRACTORY MATERIALS

REFERENCE TO RELATED APPLICATION

This application is a continuation-in-part of our patent application Ser. No. 208,255, filed on June 17, 1988, now U.S. Pat. No. 4,873,209.

BACKGROUND OF THE INVENTION

I. Field of the Invention

This invention relates to insulating lightweight refractory materials and to compositions used to form such materials. More particularly, the invention relates to insulating lightweight refractory materials which are resistant to attack by molten metals, especially to molten aluminum and its alloys.

II. Description of the Prior Art

During the production of metals such as aluminum, zinc, lead, copper, tin and their alloys, and during the casting of shaped articles from such metals, various implements and structures come into direct contact with the molten metals and must be able to resist the consequent high temperatures and chemical attack. The implements and structures should also preferably be fairly good heat insulators in order to avoid rapid cooling of the molten metals. In order to provide the necessary properties, the implements and structures are often made out of ceramic materials or have protective ceramic coatings. Ceramic-type refractories have good resistance to high temperature but may be susceptible to thermal stress cracking or to chemical attack by molten metals. For example, molten aluminum is fairly reactive with silicate-containing refractory materials, and certain aluminum alloys (notably 4.5% Mg/Al and 2.5% Li/Al) are extremely chemically aggressive. These metals tend to form destructive Al-Si-Al$_2$O$_3$ cermets from silicate refractories.

In order to counteract this destructive process, the usual practice has been to use various washes and coatings to protect the exposed refractory surfaces. Examples of such washes and coatings are mica wash, wollastonite, boneash, zirconia, thoria, titania and, recently, various carbides and nitrides. These however adhere only slightly to the surface to be protected and eventually find their way into the processed metal as undesirable impurities.

There is consequently a need for a highly insulating, light refractory material having improved resistance to molten aluminum and other related molten metals, and for a composition used to form such materials.

SUMMARY OF THE INVENTION

According to the invention there is provided a settable composition, which comprises a mixture of: ceramic fibers, wollastonite powder, and aqueous colloidal silica having a solids content of about 5-25% by wt., wherein the weight ratio of the ceramic fibres to the wollastonite powder is 0.8-1.2:1.5-2.5 respectively.

This basic composition of the invention also preferably includes milled and/or screened vermiculite. When used, the milled and/or screened vermiculite is preferably present in such an amount that the weight ratio of the ceramic fibres:the wollastonite powder:milled and-/or screened vermiculite is 0.8-1.2:1.5-2.5:0.25-0.75, respectively, and more preferably about 1:2:0.4.

The composition of the invention referred to above may additionally include reinforcing materials such as carbon fibres, metal fibres (e.g. steel fibres) or inorganic fibres.

The invention also provides to a refractory material formed by allowing the settable composition to harden and dry, optionally followed by specific surface treatments.

The invention also relates to a dry powder mixture containing the solid ingredients mentioned above but excluding the colloidal silica. This mixture may be prepared and sold ready to use to form the composition of the invention by adding aqueous colloidal silica having a solids content of about 5-25% by wt. This dry mixture and the composition of the invention are often referred to by the coined term BGLM mix.

DETAILED DESCRIPTION OF THE INVENTION

Figure 1:
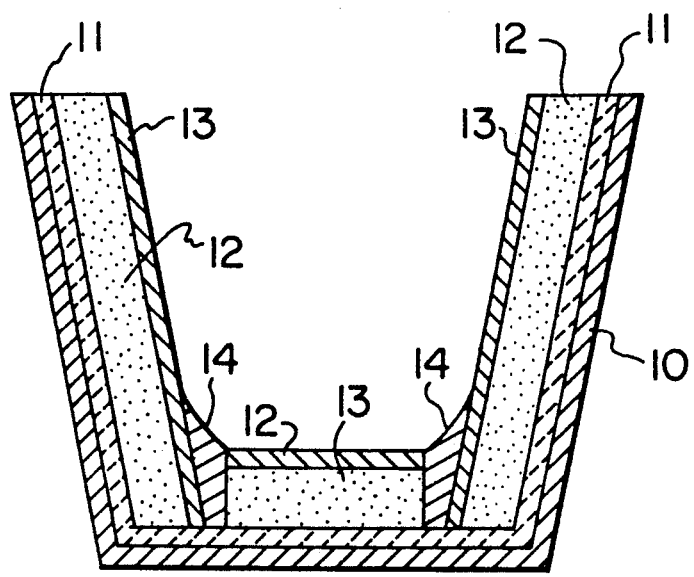
FIG. 1 is a transverse cross-section of a metal-conveying trough having a structure including a surface protecting and joining material according to the invention.

Although the colloidal silica solution contains 5-25% by weight of solids, as indicated above, a more preferred range is 10-17% by weight and the most preferred range is 12-15% by weight. If the solids content (silica) in the colloid is less than 5%, the final refractory material is unacceptably fragile because such a dilute solution has poor binding characteristics. Solids contents in the range of 5-10% give a refractory material that may be durable enough for some applications, but a solids content of 12% or more produces a very durable material. However, if the solids content is too high (above 25% by wt.), the resulting material contains too much free silica which may be attacked by molten metals, and the refractory may be weakened by silica recrystallization during high temperature operation. The range of 17-25% by weight may give an acceptable product for some applications but the preferred maximum amount is about 15% by weight.

Colloidal silica is an aqueous colloid of extremely fine silica particles which dry to form SiO$_2$.2H$_2$O. The silica may be partially hydrated to silicic acid. Colloidal silica is a commercially-available product and has a milky appearance. The commercial product normally has a solids content of about 25-30% by weight and is preferably diluted with an equal volume of water prior to use in the present invention to give formulations in the preferred 12-15% range mentioned above. Suitable commercial products include the colloidal silica sold under the trade mark LUDOX by the Du Pont Company, particularly LUDOX HS-30 and SM (negatively charged colloidal silica sols). Undiluted HS-30 has a density of 1.21 (30% solids), so after dilution with an equal volume of water the density is about 1.1 (15% solids).

Sufficient colloidal silica solution should be used in the mixture to give a product of the desired consistency for the intended application. For example, a "thick" or dense mixture suitable for casting can be prepared by mixing about 900 cc of the colloidal silica solution with 1000 g of the other basic ingredients (ceramic fibres, wollastonite powder and milled and/or screened vermiculite). On the other hand, mixes of very "thin" consistency, suitable e.g. for repairing thin cracks in castings, require 1200 or even 1400 cc per 1000 g. It will thus be seen that the amount of colloidal silica can be varied widely and suitable amounts can be found by simple trial or experimentation.

The ceramic fibres employed in the present invention are preferably made of aluminum silicate ($Al_2O_3.SiO_2$) and are generally formed from molten kaolin. The fibres are desirably chopped to a length of about ¼ inch (0.635 cm) or less (preferably 0.5 cm or less). Suitable fibres include those sold under the trade mark FIBERFRAX by The Carborundum Company and those sold under the trademark KAOWOOL by B&W Co. The chemical and physical properties of FIBERFRAX bulk fibres are as follows:

| | |
|---|---|
| $Al_2O_3$ | 51.9% by weight |
| $SiO_2$ | 47.9% by weight |
| $Na_2O$ | 0.08% by weight |
| $Fe_2O_3$ | 0.1% by weight |
| leachable chlorides | <10 ppm |
| colour | white |
| continuous use limit | 1260° C. |
| melting point | 1790° C. |
| fibre diameter | 2-3 microns (mean) |
| fibre lengths | up to 50 mm |
| specific gravity | 2.73 g/cm$^3$ |

Wollastonite powder comprises acicular natural crystals of calcium silicate ($CaO.SiO_2$), and this natural material from any suitable source may be used in the present invention. No preliminary treatment of this material needs to be carried out.

Vermiculite is a complex natural hydrated aluminum-iron-magnesium silicate mineral obtained by mining. The mined particles are normally heat expanded as part of the commercial process and are then screened and/or milled (flaked) prior to use in the present invention. The structure of vermiculite resembles mica in that its constituent particles are composed of large numbers of loosely held plates. Upon milling, e.g. upon passing the particles between rolls, the plates are separated (at least to about 80-90%) because the structure easily delaminates. The milled product can be used directly in the present invention. The heat expanded commercial product normally contains particles of size ranging from coarse to medium size as well as very small (dust). Upon sieving or screening, the particles are separated into different fractions and the very fine fraction (referred to herein as screened vermiculite) can be used instead of the milled vermiculite. The preferred particle size is generally minus 6 to plus 28 Tyler mesh. The milled and/or screened vermiculite has a much higher density than the agglomerated coarse or medium size particles. Low alkali content vermiculite (4% by weight or less of alkali, usually $K_2O$ or $Na_2O$) is preferred.

Carbon fibres, when employed, generally have a length between about ¼ and 1 inch, steel fibres, when employed, generally have a length of ½-1 inch and inorganic fibres, when employed, generally have a length of ½ to 1½ inches (preferably 1.5-2 cm). The inorganic fibres should be heat resistant and relatively inert. Chopped FIBERFRAX fibres can be used, if desired, so that the fibres may be made of the same material as the ceramic fibres mentioned above, except that the fiber lengths differ since the ceramic fibres are generally shorter. Preferably, the thickness of the carbon, steel or inorganic fibres ranges from 3-30 microns. The amount of the additional reinforcing fibres in the refractory material should be kept fairly small, e.g. 1-5 % by weight, and particularly 1-2% by weight, for the carbon fibres; 5-10% by weight and particularly 3-5% by weight, for the steel fibres; and 5-10% by weight for the inorganic fibres (the percentages being based on the solids content of the mixture).

Carbon fibres tend to stiffen the material before it dries and provide a considerable mechanical reinforcement. The fibres may be distributed throughout the mixture, even though fibres close to the metal-contacting surface may burn off, leaving a non-harmful fine porosity. Steel fibres provide reinforcement against gross cracking and impact breaking and thus provide structural rigidity and strength upon impact. However, they should preferably be kept out of contact with molten aluminum, and are thus usually used to reinforce non-surface layers. Inorganic fibres can be used as a less expensive replacement for carbon fibres. They are not as strong but can be used more extensively because of their cheapness.

The composition hardens and dries adequately at ambient temperature (usually within about 24 hours) but moderately elevated temperatures may be employed if desired to accelerate the setting process. When hardened sufficiently, the material is preferably dehydrated by heating it up to at least 200° C. and preferably 350°-400° C. to drive off free and combined water. When dehydrated, the material surprisingly attains high strength and good resistance to chemical attack by molten aluminum (700° to 800° C.) and aluminum alloys as well as other metals e.g. zinc, lead, copper, tin and their alloys.

The refractory composition of the invention can be cast to form shaped products, for example diptubes (including those larger than 2 inches in diameter that are otherwise difficult to produce), floats, hottops, control pins, or it can be used as a joining (cementing material) or surface finishing material to form a protective coating layer over other materials acting as supporting substrates. Advantageously, the cast products are machinable.

The following formulation has been found useful for casting small items:

| | |
|---|---|
| ceramic fibres | 250 g |
| wollastonite powder | 500 g |
| milled or screened vermiculite | 100 g |
| colloidal silica (commercial product containing 25-30% by weight solids diluted 50/50 by volume with water) | 500-700 ml |
| carbon fibres (optional) | 10 g |

For the casting of large items, the following formulation is found to be more suitable:

| | |
|---|---|
| ceramic fibres | 250 g |
| wollastonite powder | 500 g |
| screened vermiculite | 100 g |
| colloidal silica (commercial product containing 25-30% by weight solids diluted 50/50 by volume with water) | 600-700 ml |
| steel fibres | 25 g |

| | -continued | |
|---|---|---|
| | carbon fibres (optional) | 10 g |

For the preparation of dense joining and surface finishing (face-off) mixes, the following formulations are satisfactory for two coat applications:

| first coat: | ceramic fibres | 250 g |
|---|---|---|
| | wollastonite powder | 500 g |
| | milled vermiculite | 100 g |
| | colloidal silica<br>(commercial product<br>containing 25-30% by<br>weight solids diluted<br>50/50 by volume with water) | 500-700 ml |
| | steel fibres | 35 g |
| second coat: | as for the first coat but<br>without the steel fibres. | |

The batch sizes can of course be increased by increasing the amounts of the ingredients while maintaining the relative proportions constant. In the above mixtures, the proportion of aqueous colloidal silica to wollastonite powder is about 1-1.4 ml per gram.

In general, increasing the amount of screened vermiculite tends to decrease the density (and hence the thermal conductivity of the material). The use of milled vermiculite instead of screened vermiculite substantially increases the density and the strength of the final cast. Denser materials are also obtained by increasing the relative amounts of wollastonite in the mixture as well as making the mixes less fluid by decreasing the amount of colloidal silica binder.

The ingredients of the composition are preferably mixed together very thoroughly e.g. by using a blender-mixer (Hobart-type) or other suitable mixing apparatus. The solid powders are normally first mixed together and then the premixed solids are added to the colloidal silica and the mixing is continued for an additional 5 to 10 minutes. Reinforcing fibres, if used, are preferably added to the wet mix or simultaneously with the aqueous colloidal silica.

The casting of diptubes, floats, control pins, etc. is preferably carried out in a "breathable" plastic or rubber moulds that allows free passage of moisture when the moulded articles are setting (hardening) and drying either at room temperature or at moderately elevated temperatures (e.g. up to about 50° C.). The partially dried hard-set articles are then removed from the moulds and slowly dehydrated by heating them gradually up to about 400° C. before contacting them with molten metals. After being fully dried they can be used with molten metals at temperatures up to 800°-900° C., although the operating temperature is more preferably about 750° C. (i.e. when used with molten aluminum and aluminum alloys).

It has surprisingly been found that extremely lightweight and highly insulating but strong cast items can be made from a mixture of the formulation described above with up to 50% by weight of unmilled vermiculite (based on the total weight of ceramic fibres, wollastonite and milled and/or screened vermiculite). Thus, 100 parts by weight of the basic formulation (solids) may be mixed with up to 50 parts by weight of the vermiculite. This translates to 100 parts by volume of the basic formulation (solids) to 200 parts by volume of vermiculite.

The unmilled vermiculite used for this purpose preferably comprises particles having the following size ranges:

| Approximate Percentage<br>of Particles | Tyler Mesh |
|---|---|
| 3% | +4 |
| 56% | −4 +8 |
| 25% | −8 +16 |
| 16% | −16 |

That is, the particles (or at least the majority of the particles) preferably have a size in the range of −4 +16 Tyler mesh. A vermiculite product known as MICA-FILL or BLOCKFILL, sold by VIL Vermiculite Inc. of Rexdale, Ontario, Canada is preferred.

Different amounts of unmilled vermiculite added to the basic formulation (solids) give products of different densities for example as follows:

| wt % unmilled vermiculite | Density |
|---|---|
| (a) 50% | 38 lb/cu.ft. |
| (b) 38% | 42 lb/cu.ft. |
| (c) 0% | 64 lb/cu.ft. |

Composition (a) is the lightest material that can be obtained while still having the required strength for normal service use. This material is particularly useful for casting large hot tops and modular troughs when such bodies are likely to come into contact with corrosive aluminum alloys. Useful mixes are also those made by mixing 10, 20, 25 or 40 parts by weight of unmilled vermiculite with 100 parts by weight of the basic mix solid.

When such mixtures have been formed by thoroughly mixing the unmilled vermiculite and other ingredients, the mixtures can be cast in the normal way and allowed to dry and harden at ambient temperatures.

If desired, cast articles composed of several layers having different densities can be formed in order to provide different desirable properties in different regions of the cast articles.

Although the refractory materials obtained from the compositions of the present invention (both with and without unmilled vermiculite) are useful without any further treatment, it has been found that the strength of the materials and their resistance to attack by molten metals are improved to an entirely unexpected extent by the application of a magnesium-silicon-fluoride solution or our "SNF" treatment disclosed in our U.S. Pat. No. 4,681,819, issued on July 21, 1987.

In more detail, the refractory materials of the invention when fully set and dried are desirably surface treated with an aqueous solution of $MgSiF_6.6H_2O$ by immersion, brushing or spraying. The complex fluoride partially reacts with the refractory material making it harder, stronger and more resistant to chemical attack. The solution normally contains about 250 g $MgSiF_6.6H_2O$ per liter of water. Optionally, the material surface is also coated with a slurry of a refractory powder in colloidal silica prior to or after the fluoride treatment. The coating may be applied by hand or by spraying and dried either overnight at room temperature or for a few hours in a stream of hot air having a temperature up to about 100° C.

A typical refractory powder mixture suitable for this treatment contains (by weight)

| | |
|---|---|
| milled aluminum silicate fibres | 1 part |
| milled α-$Al_2O_3$ | 1 part |
| calcium silicate (wollastonite) | 1 part |
| kaolin | 0.3 part |

One kg of the above powder mixture requires between 0.5 liter and 1.0 liter of colloidal silica having a solids content of about 12–15% by weight. This mixture forms a relatively fluid slurry that can be applied to the material surface by brush or spray. When dry, this coating is normally subjected to the fluoride treatment.

It is believed that the fluoride exerts its protection by the following effect. The relatively unstable $MgSiF_6.6H_2O$ readily decomposes on heating to form highly stable $MgF_2$ refractory and a highly reactive light $SiF_4$ gas. A considerable part of the latter is thought to react with the elements of the refractory material resulting in the formation of a topaz-type $Al_2SiO_3.F(OH)_2$, which is a refractory material known to be very resistant to molten metal attack.

The use of the refractory composition of the present invention as a surface application material followed by the fluoride or a full "SNF" treatment indicated above, is of particular interest. This enables the surfaces of highly insulating materials, e.g. vermiculite boards, to be protected by a very strong, thin layer (e.g. about ¼ inch) of a corrosion-resistant material.

The accompanying drawings show particular applications for the composition of the invention.

The trough of FIG. 1 comprises a steel casing 10 lined with an insulating ceramic blanket 11 and three vermiculite boards 12 faced-off with a castable composition 13 according to the invention (e.g. a basic mixture containing no reinforcing fibres and no unmilled vermiculite) and subjected to a full "SNF" surface treatment. The vermiculite boards are joined at the bottom with ¾ to 1 inch thick castable composition 14 according to the invention (basic mixture) also subjected to an "SNF" surface treatment.

Figure 2:
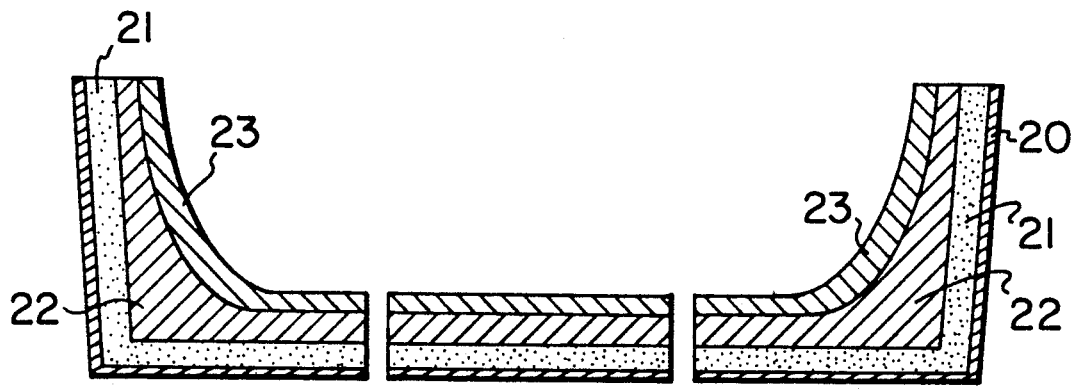
FIG. 2 is a transverse cross-section of a large casting table composed of two layers of the materials of the invention.

FIG. 2 is a cross-section of a large (6 ft. by 3 ft. by 1½ ft) casting table-basin comprising a steel casing 20, one inch thick vermiculite inulating board 21 and two cast layers 22 and 23. The lower layer 22 is of a medium density (about 40 lb/cu ft) castable composition according to the invention containing unmilled vermiculite and, advantageously, steel fibres. The outermost layer 23 is made of a castable composition of the invention containing no unmilled vermiculite but containing about 5% by weight of chopped ceramic fibres. The outermost layer 23 provides strong abrasion resistance for the surface which comes into contact with the molten metal, especially when removing metal skulls at the end of casting.

Figure 3:
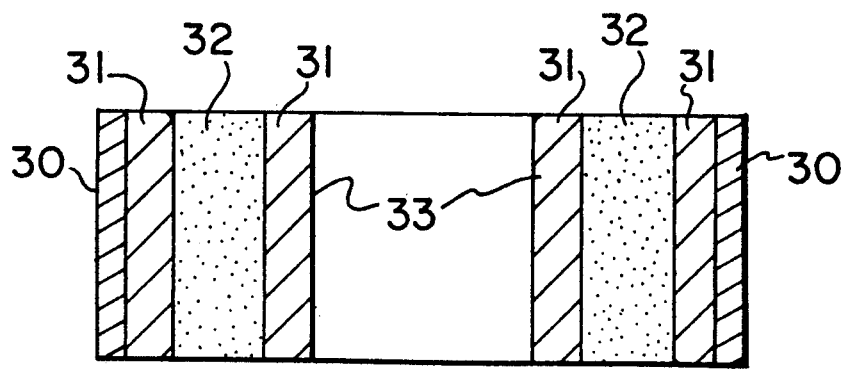
FIG. 3 is a vertical cross-section of a thermal well hottop comprising two large vermiculite slabs embedded in a castable material according to the invention.

FIG. 3 is a cross-section of a simple thermal well-hot-top comprising two large vermiculite slabs 32 (e.g. 10×3×2 inches) embedded in a castable composition 31 according to the invention containing unmilled vermiculite to give a final density of about 38 lb/cu ft. The inner surface 33 of the composition is faced-off with an "SNF" surface treatment. The entire composition article is held in a steel shell 30. In plan view, the hottop is of square or rectangular outline, and the longitudinal ends have the same construction as the sidewalls illustrated. Alternatively, the hottop may have a circular plan view, in which case the four slabs 32 would be replaced by a single cylindrical sleeve.

The compositions and materials of the present invention have been subjected to considerable testing in industrial settings with favourable results as shown by the following Examples.

EXAMPLE 1

An 80 ft long, light-weight insulating trough was cast from the formulation suitable for large items as indicated above and subjected to the "SNF" treatment. The trough has been used (Alcan Guelph Works) for conveying molten aluminum for over two years with only minor repairs. Conventional non-insulating troughs in the same service had to be completely reconstructed after six-month service periods.

EXAMPLE 2

A 20 ft trough was cast from the formulation suitable for large items indicated above and subjected to the "SNF" treatment. The trough was in operation for over 3 months (Alcan Pickering Works) with only minute touch-up repairs before being accidentally destroyed.

Additionally, at the same location, large insulating casting tables (6×2×1 ft) made of the same material out-performed the previous best tables by a factor of 3 to 5 in terms of useful life.

EXAMPLE 3

Large 2 inch (internal diameter) "steady-eddy" diptubes/spouts were cast from the formulation suitable for large items as indicated above and were subjected to the "SNF" treatment. These diptubes/spouts out-performed similar diptubes cast from fused silica by a factor of 4–6 in terms of useful life (Alcan Arvida Works).

EXAMPLE 4

A 30 ft long lightweight insulating trough was cast from the formulation suitable for large items as indicated above and has been in continuous operation for conveying molten aluminum alloys for over 3 years with only minor repairs (Alcan Kingston Experimental Foundry). Such a long performance life is unusual and can be achieved by the materials of the present invention because of the simplicity and ease of repairs (i.e. patching) using the same compositions.

It has also been found that large experimental hottops of about 6 inch (internal diameter) made from the formulation suitable for large items and subjected to the "SNF" treatment cost only a fraction of the commercially available products for comparable service.

EXAMPLE 5

The life of control spouts and skimming plates in an aluminum foundry (Alcan Kitimat Works) has been increased by 5–10 times upon the application of the face-off formulation indicated above followed by the "SNF" treatment.

EXAMPLE 6

A 30 ft. long pre-fabricated modular trough was prepared based on 2 inch thick vermiculite board. The trough was prepared by mixing the following ingredients:

| | |
|---|---|
| Powder mixture (ceramic fibres: wollastonite:milled | 40 kg |

-continued

| | |
|---|---|
| vermiculite:: 2.5:5:1 by weight) | |
| Chopped ceramic fibres (FIBERFAX, ¼ to 2 inch in length) | 1.5 kg |
| Colloidal Silica (ALCHEM colloidal silica diluted 50:50 with water to give 15% solids) | 30 liters |

Using the above ingredients, the colloidal silica was placed in a mixer and then the ceramic fibres were added while mixing at a slow speed followed by the slow addition of the powder mixture. The vermiculite board was moistened with aqueous colloidal silica and the prepared mixture was trowelled evenly to a thickness of ¼ inch on one side of the boards. The mixture was allowed to dry overnight at room temperature and then the surface of the dried mixture was slightly moistened with MgSiF$_6$ solution. The surfaces were dried for 1-2 hours in warm air and then refractory powder in silica solution was applied to the treated sides, allowed to dry to the touch and then moistened with the fluoride solution.

The vermiculite boards treated in this way were placed into a trough form using one board for the bottom and one shaped boards for the sides, leaving ¾ to 1 inch gaps between the bottom and side boards. The gaps were filled with a mixture of

| | |
|---|---|
| colloidal silica (15% solids) | (1 liter) |
| chopped fibres | (50 g) |
| Powder mixture (as above) | (1.5 kg) | after wetting the surface of the gaps with colloidal silica. The mixture was allowed to dry at least overnight in a warm room. The joints thus made were then treated with the fluoride solution, allowed to dry, and coated with refractory powder in silica. The prepared section was dried at 250° C. overnight and was ready for use.

EXAMPLE 7

Solid lightweight modular trough sections (3 ft. long) were prepared in a trough form as follows.

Each 1 ft. length of trough required 3 batches of a mixture made from the following ingredients for the first (bottom) insulating layer:

| | |
|---|---|
| Powder mixture (ceramic fibres: wollastonite:milled and/or screened vermiculite:: 2.5:5:1 by weight) | 850 g |
| Vermiculite (BLOCKFILL) | 450 g |
| Steel spikes | 100 g |
| Colloidal silica (15% solids) | 1.5 liters |

The bottom layer was pre-dried at least overnight in a warm room before applying a second layer of two batches of:

| | |
|---|---|
| Powder mixture (ceramic fibres: wollastonite:milled and/or screened vermiculite:: 2.5:5:1 by weight) | 850 g |
| Vermiculite (BLOCKFILL) | 200 g |
| Chopped FIBERFRAX | 100 g |
| Colloidal silica (15% solids) | 1.5 liters |

The resulting cast was allowed to dry before being removed from the trough form.

After removal from the trough form, the cast was left for several days to dry at room temperature before being moistened with MgSiF$_6$ solution and refractory powder in silica solution.

Large cracks in the cast were filled with a thin slurry of the basic composition of the invention and smaller cracks were later filled with refractory powder in silica solution. The cast was then dried at 250° C. overnight and was then ready for installation.

EXAMPLE 8

Casting basins were prepared in a suitable form on a base of 1 inch thick vermiculite boards. Two layers of insulating material were applied to the boards in the same manner as in Example 7.

The advantage of using the vermiculite board is that it provides good heat insulating properties. The mixes of the invention adhere well to the boards and the mixes dry faster and more uniformly in contact with the boards.

EXAMPLE 9

A casting basin was prepared in a suitable form by first casting a 1 inch thick layer from a mixture of:

| | |
|---|---|
| Powder mixture (ceramic fibres: wollastonite:milled and/or screened vermiculite:: 2.5:5:1 by weight) | 850 g |
| Vermiculite (BLOCKFILL) | 650 g |
| Steel Spikes | 150 g |
| Colloidal silica (15% solids) | 2.2 liters |

The layer was allowed to dry in a warm room for one or more days and then second and third layers of mix were applied as described in Example 7.

Large cracks in the resulting casting were filled with a thin slurry of the basic mix. Fine cracks were filled with refractory powder in colloidal silica solution.

What we claim is:

1. A settable composition, which comprises a mixture of:
   ceramic fibres,
   wollastonite powder,
   aqueous colloidal silica having a solids content of about 5-25% by wt., and
   unmilled vermiculite;
   wherein the weight ratio of the ceramic fibres to the wollastonite powder is 0.8-1.2:1.5-2.5, respectively; and wherein the amount of unmilled vermiculite is up to 50% by weight based on the total weight of the ceramic fibres and wollastonite powder.

2. A composition according to claim 1 wherein the aqueous colloidal silica has a solids content in the range of about 10-17% by wt.

3. A composition according to claim 1 wherein the aqueous colloidal silica has a solids content in the range of about 12-15% by wt.

4. A settable composition which comprises a mixture of:
   ceramic fibres,
   wollastonite powder,
   aqueous colloidal silica having a solids content of about 5-25% by wt.,
   milled and/or screened vermiculite, and
   unmilled vermiculite;
   wherein the weight ratio of the ceramic fibres, the wollastonite powder and the milled and/or screened vermiculite is 0.8-1.2:1.5-2.5:0.25-0.75, respectively; and wherein the amount of unmilled vermiculite is up to about 50% by weight based on the total weight of the ceramic fibres, the wollastonite powder and the milled and/or screened vermiculite.

5. A composition according to claim 4 wherein the weight ratio of ceramic fibres:wollastonite:milled and/or screened vermiculite is about 1:2:0.4, respectively.

6. A composition according to claim 1, which additionally comprises carbon fibres.

7. A composition according to claim 1, which additionally comprises 1 to 2% by weight of carbon fibres.

8. A composition according to claim 1, which additionally comprises steel fibres.

9. A composition according to claim 1, which additionally comprises 3 to 5% by weight of steel fibres.

10. A composition according to claim 1, which additionally comprises inorganic fibres.

11. A composition according to claim 1, which additionally comprises 5 to 10% by weight of inorganic fibres.

12. A composition according to claim 1, wherein the ceramic fibres have a length of less than about one quarter of an inch.

13. A composition according to claim 1, wherein said unmilled vermiculite is made up of particles of the following sizes in approximately the following percentages:

| Percentage of Vermiculite | Particle Size Range (Tyler mesh) |
| --- | --- |
| 3% | −4 |
| 56% | −4 +8 |
| 25% | −8 +16 |
| 16% | −16 |

14. A refractory material obtained by hardening and drying a composition which comprises a mixture of:
ceramic fibres,
wollastonite powder,
aqueous colloidal silica having a solids content of about 5-25% by wt., and
unmilled vermiculite;
wherein the weight ratio of the ceramic fibres to the wollastonite powder is 0.8-1.2:1.5-2.5, respectively; and wherein the amount of unmilled vermiculite is up to 50% by weight based on the total weight of the ceramic fibres and wollastonite powder.

15. A material according to claim 14 having a surface of increased resistance to chemical attack resulting from a surface treatment with a magnesium-silicon-fluoride solution.

16. A material according to claim 15 wherein the solution is an aqueous solution of $MgSiF_6.6H_2O$.

17. A material according to claim 16 wherein the solution contains about 250 g of $MgSiF_6.6H_2O$ per liter of water.

18. A material according to claim 14 having a surface of increased resistance to chemical attack resulting from a surface treatment with a refractory powder slurry.

19. A material according to claim 18 wherein the refractory powder comprises milled aluminum silicate fibres, milled α-$Al_2O_3$, calcium silicate and kaolin, mixed with colloidal silica having a solids content of about 12-15% by weight.

20. A material according to claim 19 wherein the refractory powder comprises:

| | |
| --- | --- |
| milled aluminum silicate fibres | 1 part |
| milled α-$Al_2O_3$ | 1 part |
| calcium silicate (wollastonite) | 1 part |
| kaolin | 0.3 part | and wherein the volume ratio of the above combined solids to the colloidal silica is about 1:1.

21. A material according to claim 14 having a surface of increased resistance to chemical attack resulting from a surface treatment with a refractory powder slurry and a magnesium-silicon-fluoride solution.

22. A material according to claim 21 wherein the magnesium-silicon-fluoride solution is an aqueous solution of $MgSiF_6.6H_2O$.

23. A material according to claim 21 wherein the refractory powder comprises milled aluminum silicate fibres, milled α-$Al_2O_3$, calcium silicate and kaolin mixed with colloidal silica having a solids content of about 12-15% by weight.

24. A material according to claim 14 formed by allowing a composition according to claim 1 to harden at about ambient temperature and then heating the hardened product up to about 400° C. in order to drive out both free and combined water.

25. A material according to claim 14 in the form of a shaped article.

26. A material according to claim 14 in the form of at least one layer attached to a supporting substrate.

27. A device for channelling or containing a molten metal, said device comprising a refractory material obtained by hardening and drying a composition which comprises a mixture of:
ceramic fibres,
wollastonite powder,
aqueous colloidal silica having a solids content of about 5-25% by wt., and
unmilled vermiculite;
wherein the weight ratio of the ceramic fibres to the wollastonite powder is 0.8-1.2:1.5-2.5, respectively; and wherein the amount of unmilled vermiculite is up to 50% by weight based on the total weight of the ceramic fibres and wollastonite powder;
said material having at least one surface which is exposed to the molten metal in use.

28. A device according to claim 27 wherein said at least one surface has increased resistance from chemical attack resulting from a treatment with a magnesium-silicon-fluoride solution.

29. A device according to claim 28 wherein said at least one surface has increased resistance to chemical attack resulting from a treatment with a refractory powder slurry.

30. A device for channelling or containing a molten metal, said device comprising a refractory material obtained by hardening and drying a mixture comprising:
ceramic fibres;
wollastonite powder;
milled and/or screened vermiculite; and
aqueous colloidal silica having a solids content of about 5-25% by weight;
wherein the weight ratio of the ceramic fibres, the wollastonite powder and the milled and/or screened vermiculite is 0.8–1.2:1.5–2.5:0.25–0.75, respectively; said material having at least one surface which is exposed to the molten metal during use.

31. A device according to claim 30 wherein said at least one surface has increased resistance to chemical attack resulting from a treatment with a refractory powder slurry.

32. A device according to claim 30 wherein said at least one surface has increased resistance from chemical attack resulting from a treatment with a magnesium-silicon-fluoride solution.

33. A metal conveying trough comprising a metal casing, a thermal insulating material within the casing, at least one vermiculite board adjacent said thermal insulation and a refractory material overlying said at least one vermiculite board, and filling any joints formed between boards, said refractory material having been formed by hardening and drying a mixture comprising:
ceramic fibres;
wollastonite powder;
milled and/or screened vermiculite; and
aqueous colloidal silica having a solids content of about 5–25% by weight;
wherein the weight ratio of the ceramic fibres, the wollastonite powder and the milled and/or screened vermiculite is 0.8–1.2:1.5–2.5:0.25–0.75, respectively;
and then treating metal-contacting surfaces of said refractory material with a magnesium-silica-fluoride solution and a refractory powder.

34. A metal casting table basin comprising a steel casing, at least one vermiculite board within the casing adjacent to an inner wall thereof, and at least two layers of a refractory material overlying said at least one vermiculite board, a first one of said layers contacting at least one vermiculite board having been formed by hardening and drying a composition which comprises a mixture of:
ceramic fibres,
wollastonite powder,
aqueous colloidal silica having a solids content of about 5–25% by wt., and
unmilled vermiculite;
wherein the weight ratio of the ceramic fibres to the wollastonite powder is 0.8–1.2:1.5–2.5, respectively; and wherein the amount of unmilled vermiculite is up to 50% by weight based on the total weight of the ceramic fibres and wollastonite powder;
and a second one of said layers overlying the first layer having been formed by hardening and drying a mixture of:
ceramic fibres;
wollastonite powder;
milled and/or screened vermiculite; and
aqueous colloidal silica having a solids content of about 5–25% by weight;
wherein the weight ratio of the ceramic fibres, the wollastonite powder and the milled and/or screened vermiculite is 0.8–1.2:1.5–2.5:0.25–0.75, respectively.

35. A thermal well hottop comprising a metal channel and a refractory lining within said channel, said refractory lining comprising a first layer of refractory material adjacent an inner wall of said metal channel, a vermiculite board adjacent said first layer and a second layer of refractory material overlying said vermiculite board and defining a metal-contacting surface;
said first and second layers having been formed by hardening and drying a composition which comprises a mixture of:
ceramic fibres,
wollastonite powder,
aqueous colloidal silica having a solids content of about 5–25% by wt., and
unmilled vermiculite;
wherein the weight ratio of the ceramic fibres to the wollastonite powder is 0.8–1.2:1.5–2.5, respectively; and wherein the amount of unmilled vermiculite is up to 50% by weight based on the total weight of the ceramic fibres and wollastonite powder;
and said metal-contacting surface having been subjected to treatment with a magnesium-silica-fluoride solution and a refractory powder.

36. A refractory material obtained by hardening and drying a settable composition which comprises a mixture of:
ceramic fibres,
wollastonite powder,
aqueous colloidal silica having a solids content of about 5–25% by wt.,
milled and/or screened vermiculite, and
unmilled vermiculite;
wherein the weight ratio of the ceramic fibres, the wollastonite powder and the milled and/or screened vermiculite is 0.8–1.2:1.5–2.5:0.25–0.75, respectively; and wherein the amount of unmilled vermiculite is up to about 50% by weight based on the total weight of the ceramic fibres, the wollastonite powder and the milled and/or screened vermiculite.

37. A device for channelling or containing a molten metal, said device comprising a refractory material obtained by hardening and drying a composition which comprises a mixture of:
ceramic fibres,
wollastonite powder,
aqueous colloidal silica having a solids content of about 5–25% by wt.,
milled and/or screened vermiculite, and
unmilled vermiculite;
wherein the weight ratio of the ceramic fibres, the wollastonite powder and the milled and/or screened vermiculite is 0.8–1.2:1.5–2.5:0.25–0.75, respectively; and wherein the amount of unmilled vermiculite is up to about 50% by weight based on the total weight of the ceramic fibres, the wollastonite powder and the milled and/or screened vermiculite;
said material having at least one surface which is exposed to the molten metal in use.

38. A metal casting table basin comprising a steel casing, at least one vermiculite board within the casing adjacent to an inner wall thereof, and at least two layers of a refractory material overlying said at least one vermiculite board, a first one of said layers contacting at least one vermiculite board having been formed by hardening and drying a composition which comprises a mixture of:
ceramic fibres,
wollastonite powder,
aqueous colloidal silica having a solids content of about 5–25% by wt.,
milled and/or screened vermiculite, and
unmilled vermiculite;

wherein the weight ratio of the ceramic fibres, the wollastonite powder and the milled and/or screened vermiculite is 0.8-1.2:1.5-2.5:0.25-0.75, respectively; and wherein the amount of unmilled vermiculite is up to about 50% by weight based on the total weight of the ceramic fibres, the wollastonite powder and the milled and/or screened vermiculite;

and a second one of said layers overlying the first layer having been formed by hardening and drying a mixture of:
ceramic fibres;
wollastonite powder;
milled and/or screened vermiculite; and
aqueous colloidal silica having a solids content of about 5-25% by weight;
wherein the weight ratio of the ceramic fibres, the wollastonite powder and the milled and/or screened vermiculite is 0.8-1.2:1.5-2.5:0.25-0.75, respectively.

39. A thermal well hottop comprising a metal channel and a refractory lining within said channel, said refractory lining comprising a first layer of refractory material adjacent an inner wall of said metal channel, a vermiculite board adjacent said first layer and a second layer of refractory material overlying said vermiculite board and defining a metal-contacting surface;
said first and second layers having been formed by hardening and drying a composition which comprises a mixture of:
ceramic fibres,
wollastonite powder,
aqueous colloidal silica having a solids content of about 5-25% by wt.,
milled and/or screened vermiculite, and
unmilled vermiculite;
wherein the weight ratio of the ceramic fibres, the wollastonite powder and the milled and/or screened vermiculite is 0.8-1.2:1.5-2.5:0.25-0.75, respectively; and wherein the amount of unmilled vermiculite is up to about 50% by weight based on the total weight of the ceramic fibres, the wollastonite powder and the milled and/or screened vermiculite;
and said metal-contacting surface having been subjected to treatment with a magnesium-silica-fluoride solution and a refractory powder.

* * * * *